United States Patent

[11] 3,609,161

| [72] | Inventor | Rostyslaw Dowbenko |
| | | Gisbonia, Pa. |
| [21] | Appl. No. | 665,745 |
| [22] | Filed | Sept. 6, 1967 |
| [45] | Patented | Sept. 28, 1971 |
| [73] | Assignee | PPG Industries, Inc. |
| | | Pittsburgh, Pa. |

[54] THERMOSETTING ACRYLICS CONTAINING OXAZOLINE GROUPS
4 Claims, No Drawings

[52] U.S. Cl..................................................... 260/307,
117/132, 117/161, 156/327, 260/79.5, 260/80.5,
260/83.5, 260/86.1, 260/86.3, 260/86.7, 260/88.3
[51] Int. Cl......................................................... C07d 85/36
[50] Field of Search............................................ 260/307.6

[56] References Cited
UNITED STATES PATENTS

| 2,372,410 | 3/1945 | Tryon............................ | 260/307 |
| 2,504,951 | 4/1950 | Tryon............................ | 260/307 |
| 3,348,958 | 10/1967 | Cockerham et al........... | 260/307 |

OTHER REFERENCES

Wagner et al., Synthetic Organic Chemistry, (New Yprk, 1953), pages 480–483 and 486–487.

*Primary Examiner*—Alton D. Rollins
*Attorney*—Chisholm and Spencer

ABSTRACT: Novel polymerizable unsaturated oxazoline compounds are obtained by dehydrating a hydroxyalkyl-substituted aminoethanol and esterifying or transesterifying the resulting alcohol with an ethylenically unsaturated monocarboxylic acid, an ester of such an acid, or an ethylenically unsaturated monocarboxylic acid halide. Preferred embodiments include 2,4-dialkyl-2-oxazoline-4-alkyl acrylates and methacrylates. Polymers of such compounds, and particularly their interpolymers with other ethylenic monomers provide thermosetting film-forming compositions, useful as protective coatings and adhesives.

Vinyl interpolymers are useful in coatings because of their excellent durability and weatherability, solvent resistance, and adhesion. However, it is difficult to obtain vinyl polymers having the combination of properties necessary to provide coatings of overall utility for many applications. For instance, cured coatings of sufficient adhesion and hardness tend to have insufficient flexibility for many desired uses, and compositions having suitable application characteristics often are deficient in coating properties. Thus, polymers which can provide improvement in several properties without sacrificing others are of continuing and increasing interest.

THERMOSETTING ACRYLICS CONTAINING OXAZOLINE GROUPS

The present invention provides new thermosetting resinous compositions which provide coatings having an excellent overall combination of properties. These compositions comprise polymers of novel monoesters of (1) a polymerizable ethylenically unsaturated monocarboxylic acid, and (2) a substituted oxazoline alcohol. Polymers and interpolymers of such monoesters with vinyl monomers have excellent cross-linking characteristics, and form tough, hard adherent films with improved properties such as weatherability and solvent resistance.

Although the monoesters are described generally as being a monoester of a monocarboxylic acid and substituted-oxazoline alcohol, the novel monoester of this invention can be made by reacting the substituted-oxazoline alcohol with not only the monocarboxylic acid, but also the esters or the acid halides thereof. The product of all of these reactions will be the monoester so generically described.

The new monoesters of the polymerizable ethylenically unsaturated monocarboxylic acid and a substituted-oxazoline alcohol are obtained by first dehydrating a hydroxy-substituted aminoethanol with a carboxylic acid and esterifying or transesterifying the resulting product with a polymerizable ethylenically unsaturated monocarboxylic acid or an ester thereof, or an ethylenically unsaturated monocarboxylic acid halide.

The dehydration reaction between the carboxylic acid and the hydroxy-substituted aminoethanol proceeds in accordance with the following equation:

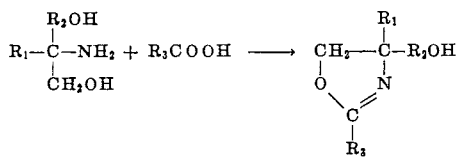

wherein $R_1$ is selected from the group consisting of alkyl groups, hydrogen, and aryl groups; $R_2$ is selected from the group consisting of alkylene and alkyl aryl groups; and $R_3$ is selected from the group consisting of alkyl groups, aryl groups, and alkyl aryl groups. This product is a substituted-oxazoline alcohol.

The starting material can be any hydroxyalkyl-substituted aminoethanol, although the preferred starting compound is a 1,3-dihydroxy-2-aminopropane. The length of the alkyl or aryl group of $R_1$ and the alkylene or alkyl aryl group of $R_2$ is immaterial, but the preferred compounds contain alkyl groups with one to 10 carbon atoms such as methyl, ethyl, isopropyl, hexyl, octyl and decyl groups, or alkyl aryl (alkaryl) groups wherein the alkyl portion contains one to 10 carbon atoms such as benzyl, phenylethyl, phenyloctyl, and phenyldecyl groups, and alkylene groups with one to 10 carbon atoms such as methylene, ethylene, isopropylene, hexylene, and octylene groups. Some examples of hydroxy-substituted aminoethanols are 2-methyl-2-amino-1,3-dihydroxy-propane, 2-amino-1,3-dihydroxy-2-methylpentane, 2-amino-1,3-dihydroxy-2-ethyl-4-methylpentane, 2-amino-1,4-dihydroxy-2-ethyl-3-methylbutane, 2-amino-1,5-dihydroxy-2-isopropylpentane, 1-hydroxy-2Amino-2-[4-(2-hydroxyethyl) phenyl] propane, 1-hydroxy-2amino-2-[4-(hydroxymethyl) phenyl] butane, and others following the general description above. Compounds containing more than two primary hydroxy groups, such as amino trimethylol methane, are not included in the class of starting materials described.

The acid used to dehydrate the hydroxy-substituted aminoethanol can be any carboxylic acid following the description given above. Examples are acetic acid, propionic acid, formic acid, fatty acids, phenylpropionic acid, benzoic acid, and other aromatic acids, etc. In a preferred embodiment, acetic acid is utilized.

The reaction conditions used to produce the substituted-oxazoline alcohol are not critical. It is only necessary that enough acid be present to dehydrate the hydroxyalkyl-substituted aminoethanol. No solvent is necessary, and the temperature of the reaction may be varied over a wide range, although it is preferred to carry out the reaction at temperatures of about 100° C. to 250° C. to increase the speed of reaction.

The product of the dehydration reaction is a substituted-oxazoline alcohol of the formula:

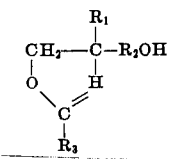

wherein $R_1$, $R_2$, and $R_3$ are as above. This substituted-oxazoline alcohol is then esterified or transesterified with a polymerizable ethylenically unsaturated monocarboxylic acid, an ester thereof, or an ethylenically unsaturated monocarboxylic acid halide to form the new compounds of this invention.

The esterification or transesterification can be accomplished by reacting the substituted-oxazoline alcohol with any polymerizable ethylenically unsaturated monocarboxylic acid or ester, or ethylenically unsaturated monocarboxylic acid halide. For example, acrylic acid, methacrylic acid, crotonic acid, and alkyl esters of such acids including alkyl methacrylates, such as methyl methacrylate, ethyl methacrylate, isopropyl methacrylate, and hexyl methacrylate, and alkyl acrylates, such as methyl acrylate, isopropyl acrylate, ethyl acrylate, and octyl acrylate, and alkyl crotonates, such as methyl crotonate, ethyl crotonate, and octyl crotonate, can be employed, as can acrylyl halides, methacrylyl halides, and crotonyl halides, such as acrylyl chloride, methacrylyl bromide, crotonyl fluoride, and others. The preferred reactants are methyl methacrylate, methacrylyl chloride, acrylic acid, and methacrylic acid.

The esterification or transesterification reaction conditions are not critical. The reaction can be carried out at room temperature; however, it is preferred to use temperatures from about 90° C. to 125° C. to increase the speed of reaction. The ratio of reactants, also, is not critical.

The esterification or transesterification may be aided by the use of a catalyst, such as tetraisopropyl titanate or an alkali metal hydroxide. Examples of catalysts that may be used include: potassium hydroxide, magnesium hydroxide, methyl titanates, and tetrabutyl titanate. The materials can be added to the reaction in any order but it is preferred that the addition of the substituted-oxazoline alcohol to the solvent be carried out first if a solvent such as benzene or trichloromethane is used, and the solution allowed to cool before adding the carboxylic acid, its ester, or halide, and refluxing. If such a catalyst is present, it is ordinarily employed in an amount between 0.1 percent and 10 percent by weight of the starting substituted-oxazoline alcohol. The resulting product of the reaction is the novel monoester.

The above novel monoesters are particularly useful in polymers for various purposes. They are addition polymerized by a free-radical initiated reaction to provide a thermosetting polymer. The polymer can be cross-linked, for example, by heating by itself or in the presence of a dicarboxylic acid.

While the homopolymers described above have excellent properties for some purposes, the preferred polymers of the invention contain at least one other unsaturated monomer interpolymerized with the monoester to form a thermosetting resinous interpolymer.

Any polymerizable monomeric compound containing at least one $CH_2=C<$ group may be polymerized with the novel monoester. Examples of such monomers include the following:

Monoolefinic and diolefinic hydrocarbons, such as styrene, alpha-alkylstyrene, vinyltoluene, isobutylene, ethylene, propylene, butylene, isoprene, and the like;

Halogenated monoolefinic and diolefinic hydrocarbons, such as alpha-chlorostyrene, 2,5-dibromostyrene, 2-chloropropene, 1,1-dichloroethylene, chlorobutadiene, and other halogenated diolefinic compounds;

Esters of organic and inorganic acids, such as vinyl propionate, vinyl methoxybenzoate, methyl methacrylate, ethyl methacrylate, propyl methacrylate, butyl methacrylate, hexyl methacrylate, octyl methacrylate, decyl methacrylate, lauryl methacrylate, 2-hydroxyethyl methacrylate, methyl crotonate, ethyl tiglate, methyl acrylate, ethyl acrylate, propyl acrylate, isopropyl acrylate, butyl acrylate, hexyl acrylate, 2-ethylhexyl acrylate, decyl acrylate, dodecyl acrylate, 2-hydroxyethyl acrylate, 2-hydroxypropyl acrylate, isopropenyl acetate, vinyl chloroacetate, allyl chloride, allyl acetate, beta-ethylallyl chloride, methyl alpha-chloroacrylate, and dimethyl maleate;

Organic nitriles, such as acrylonitrile, methacrylonitrile, ethacrylonitrile, and the like;

Acid monomers, such as acrylic acid, methacrylic acid, crotonic acid, 3-butenoic acid, tiglic acid, angelic acid, methyl hydrogen maleate, butyl hydrogen fumarate, and the like.

It is to be understood that the above polymerizable olefinic monomers are representative only and do not include all of the $CH_2=C<$ containing monomers which may be employed.

An important advantage of the monoesters of the invention is that they form useful interpolymers as described. Diesters of this general class begin to gel at once in the presence of a vinylic monomer, such as styrene, so that interpolymerization cannot be effected. Hence, such diesters are not useful in the present invention.

In carrying out the polymerization reaction, a free-radical initiating-type catalyst, particularly a peroxygen or an azo compound, is ordinarily utilized. The most useful compound found is azo bis(isobutyronitrile). Other useful catalysts for this purpose include acetyl peroxide, benzoyl peroxide, hydroxyheptyl peroxide, methyl ethyl ketone peroxide, 2,4-dichlorobenzoyl peroxide, cumene hydroperoxide, t-butyl hydroperoxide, methyl amyl ketone peroxide, p-chlorobenzoyl peroxide, peracetic acid, t-butyl permaleic acid, t-butyl peracetate, isopropyl peroxy dicarbonate, and the like. In some polymerization reactions, mixtures of the above peroxygen compounds are used to secure desired conversions.

The quantity of catalyst employed can vary considerably; however, in most instances, it is most desirable to utilize from about 0.1 percent to 3 percent. If high viscosities are desired, a low initial level of catalyst, followed by the necessary additions to get 100 percent conversion, is preferably employed. For low viscosity interpolymers, the bulk of the catalyst is added initially and later additions used only to secure desired conversions. Larger amounts of catalysts added initially give lower viscosities.

Since it is desirable that the interpolymers of the monoesters of the oxazoline compounds with other ethylenically unsaturated monomers be relatively low in molecular weight so that they can be dissolved at high solids and low viscosity, a chain-modifying agent, or chain terminator, may be added to the polymerization mixture. The mercaptans, such as dodecyl mercaptan, tertiary dodecyl mercaptan, octyl mercaptan, hexyl mercaptan, and the like, are conventionally used for this purpose, although other chain-modifying agents such as cyclopentadiene, and the like can also be used to secure low molecular weights.

The polymerization is best carried out by admixing the monoester of the oxazoline and the other monomer or monomers, the catalysts, and the chain-modifying agent, if any, in a solvent, and refluxing the resulting solution for a time sufficient to obtain the desired conversion. Ordinarily, the polymerization will be complete in about 1 to 16 hours.

Polymers of the above-described monoesters of the polymerizable ethylenically unsaturated monocarboxylic acid and substituted-oxazoline alcohol are film-forming and can be used as protective coatings, and for similar purposes in which such characteristics are desired. Both homopolymers of these esters and interpolymers with other copolymerizable ethylenically unsaturated monomers are useful as protective coatings. The polymers dry very rapidly to produce flexible films which have excellent mar resistance and other desirable properties.

Both the homopolymer and the interpolymers described above also have desirable adhesive qualities which make them useful as bonding agents and adhesives.

The polymers can be coated onto many substrates, such as metal, wood, glass, etc., to protect the surface and also are useful as films in laminates.

The polymers are easily cured by drying and baking at a low temperature for a short period of time to form a glossy solvent-resistant film. The polymers are generally cured by heating at temperatures of from 325° F. to 375° F. for about one-half hour. The curing temperatures of the interpolymer may be lowered by adding a small amount of curing catalyst, such as mono and dibutyl phosphate.

Pigments, such as titanium dioxide, carbon black, and the like, may be added to the coating composition to form any desired color. Other ingredients normally found in coating compositions, such as germicides, fillers, driers, silicones, and the like, may be added.

The following examples illustrate in detail the preparation of the alcohol-modified oxazoline, the new monoester, and interpolymers of the monoesters with other monomers. The examples are not intended to limit the invention, however, for there are numerous possible variations and modifications. All parts and percentages are by weight and are based upon nonvolatile solids content, unless otherwise indicated.

EXAMPLE I

This example illustrates the preparation of a novel monoester by first dehydrating the hydroxyalkyl-substituted aminoethanol with acid and esterifying the substituted-oxazoline alcohol product with acrylic acid to form 2,4-dimethyl-2-oxazoline-4-methyl acrylate.

The substituted-oxazoline alcohol was prepared by adding 68 parts of acetic acid to 105.1 parts of 2-methyl-2-amino-1,3-propanediol and refluxing the mixture for 4 hours at temperatures of from 158° C. to 203° C., while removing 40 parts of evolved water. The resulting product was 168.4 parts of a compound having the formula:

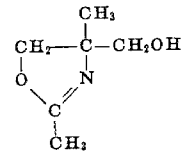

The 2,4-dimethyl-4-hydroxymethyl-2-oxazoline prepared above was esterified with acrylic acid by mixing 25.8 parts of the 2,4-dimethyl-4-hydroxymethyl-2-oxazoline with 17.6 parts of benzene, 0.1 part of phenothiazine, and 28.8 parts of acrylic acid. An exothermic reaction took place and after the temperature stabilized, 0.11 part of sulfuric acid was added and the mixture was stirred and heated to reflux. After 1½ hours, at a temperature of 93° C., another 0.11 part of sulfuric acid was added and after 2 more hours, another 2.2 parts of sulfuric acid were added. The reaction conditions were maintained for 13½ hours. The product obtained was 2,4-dimethyl-2-oxazoline-4-methyl acrylate.

EXAMPLE II

A monoester was prepared by the esterification of 2,4-methyl-4-hydroxymethyl-2-oxazoline (prepared as in Example I) with methacrylic acid by the following method:

A glass reaction vessel was charged with 25.8 parts of 2,4-dimethyl-4-hydroxymethyl-2-oxazoline, 20.6 parts of methacrylic acid, and 26.4 parts of benzene. This mixture was stirred and heated to reflux and the reaction continued for 2½ hours at 96° C. The resulting product was a monoester having the formula:

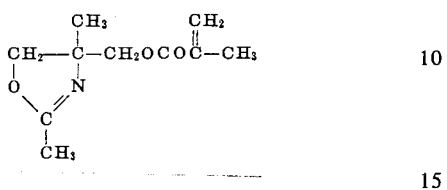

which had a boiling point range of 54° to 60° C., at 0.10 mm.Hg. and a refractive index of $N_d^{25}$ 1.4502.

EXAMPLE III

A monoester was prepared by the tranesterification of 2,4-dimethyl-4-hydroxymethyl-2-oxazoline with methyl methacrylate by the following method:

38.3 parts of 2,4-dimethyl-4-hydroxymethyl-2-oxazoline, and 59.4 parts of methyl methacrylate were added to 1.5 parts of hydroquinone and 0.8 parts of tetraisopropyl titanate. These materials were stirred and heated to reflux and the reaction continued for 14 hours at 108° C. The mixture was then cooled, washed with water, and dried over sodium sulfate. The sodium sulfate was filtered off, 0.5 part of hydroquinone was added, and the ether removed. The residue was distilled on a vacuum pump. The product was identical to that obtained in Example II.

EXAMPLE IV

A monoester was prepared by the transesterification of 2,4-dimethyl-4 -hydroxymethyl-2-oxazoline with methacrylyl chloride by the following method:

A 1-liter flask was charged with 51.7 parts of 2,4-dimethyl-4-hydroxymethyl-2-oxazoline in 150 parts of trichloromethane, to which 45.5 parts of triethylamine were added. To this solution, 41.3 parts of methacrylyl chloride were added dropwise at a steady rate at 25° C. An additional 150 parts of trichloromethane were added and the mixture stirred for 3 hours. The product was the same as those obtained in Examples II and III.

EXAMPLE V

This example illustrates the monopolymerization of the monoester of a polymerizable, ethylenically unsaturated monocarboxylic acid and a substituted-oxazoline alcohol. The monoester used was 2,4-dimethyl-2-oxazoline-4-methyl methacrylate, prepared as in Examples II, III, and IV. The homopolymer was prepared using the method set forth below:

Twenty parts of 2,4-dimethyl-2-oxazoline-4-methyl methacrylate, 70 parts of benzene, and 0.3 parts of azo bis(isobutyronitrile) were charged to a reaction vessel and the contents stirred and heated to reflux. After stirring for 4 hours at 81° C., an additional 10 parts of benzene and 0.2 part of azo bis(isobutyronitrile) were added. The reaction was run at 81° C. for a total of 7 hours. The product had a solids content of 20.1 percent and a viscosity of A. The product was drawn down on a steel panel and baked at 350° F. for 30 minutes. The coating was found to be hard, adherent, but somewhat brittle and had good gloss characteristics and was insoluble in xylene.

EXAMPLE VI

This example illustrates the interpolymerization of the monoester of a polymerizable ethylenically unsaturated monocarboxylic acid and a substituted-oxazoline alcohol with other copolymerizable ethylenically unsaturated monomers. The interpolymer was prepared using the method set forth below:

A mixture of 40 parts of xylene and 10 parts of butanol were stirred and heated to 90° C. Ten parts of 2,4-dimethyl-2-oxazoline-4-methyl methacrylate, 33.3 parts of hydroxyethyl methacrylate, 35.0 parts of methyl methacrylate, 3 parts of acrylic acid, and 42.0 parts of 2-ethylhexyl acrylate were then added slowly, along with 0.8 part of azo bis(isobutyronitrile) over a 3½ hour period. When the addition was complete, a mixture of 0.2 part of azo bis(isobutyronitrile) and 26.7 parts of xylene were added and the mixture was stirred at 90° C. for 8 hours. The product had a Gardner-Holdt viscosity of Z–3, and a solids content of 50.2 percent.

This product was drawn down on a metal panel, flash dried for one-half hour, and then baked at 325° F. for one-half hour. The coating obtained had excellent properties, including excellent adhesion and flexibility. It was solvent resistant, as shown by the xylene rub test, where the coating was rubbed with a cloth saturated with xylene 40 times. Since no appreciable surface change was discernable, the film was determined to be solvent resistant and fully cured.

EXAMPLE VII

An interpolymer was prepared from a mixture of the following materials:

|  | Parts by Weight |
| --- | --- |
| 2,4-Dimethyl-2-oxazoline 4-methyl methacrylate | 10 |
| 2-Hydroxyethyl methacrylate | 10 |
| Methyl methacrylate | 40 |
| 2-Ethylhexyl acrylate | 35 |
| Acrylic acid | 5 |

A vessel was charged with 75 parts of xylene and 25 parts of butanol, stirred and heated to 90° C. The above ingredients were added dropwise over a period of 3½ hours, along with 0.8 part of azo bis(isobutyronitrile) and 0.1 part of t-dodecyl mercaptan. An additional 0.2 part of azo bis(isobutyronitrile) was then added. Heating and stirring at 88° to 90° C. was continued for a total of 8 hours. The Gardner-Holdt viscosity of the resulting product was found to be Y-Z, and the solids content was 45.0 percent.

The above composition was drawn down on a metal panel to test for brittleness, susceptibility to xylene rub test, and mar resistance. The coated panel was baked at 325° F. for one-half hour. The coating was found to have fairly good mar resistance, was very flexible, and was only slightly affected by the xylene rub test.

EXAMPLE VIII

An interpolymer was prepared from a mixture of the following materials:

|  | Parts by Weight |
| --- | --- |
| 2,4-Dimethyl-2-oxazoline- 4-methyl methacrylate | 10 |
| Methyl methacrylate | 50 |
| 2-Ethylhexyl acrylate | 35 |
| Acrylic acid | 5 |

A vessel was charged with 75 parts of xylene and 25 parts of butanol, stirred and heated to 88° to 90° C. A mixture of 100 parts of the above ingredients with 0.8 part of azo bis(isobutyronitrile) and 0.1 part of t-dodecyl mercaptan was added dropwise. An additional 0.2 part of azo bis(isobutyronitrile)

was added, and the heating at 90° C. was continued for a total of 8 hours. The resulting interpolymer had a Gardner-Holdt viscosity of X–Y, and the solids content was 48.5 percent.

The interpolymer was drawn down on a metal panel for testing. The coated panel was flash dried for one-half hour and baked at 325° F. for one-half hour. The product was similar to that formed in Example VII.

It is seen that the choice of solvents used is not critical for the interpolymerization. The interpolymer may contain anywhere from 0 to 99 percent by weight of the new monoester but preferably contains from 1 to 50 percent by weight for these thermosetting systems. Optimum results are obtained by using from 5 to 20 percent by weight of the new monoester. While there are above described a number of specific embodiments of the present invention, it is obviously possible to produce other embodiments and various equivalent modifications thereof without departing from the spirit of the invention or the scope of the appended claims.

I claim:

1. A monoester of (1) a polymerizable ethylenically unsaturated monocarboxylic acid or ester or halide selected from the group consisting of acrylic acid, methacrylic acid, crotonic acid, alkyl esters of acrylic acid, alkyl esters of methacrylic acid, alkyl esters of crotonic acid, halides of acrylic acid, halides of methacrylic acid, and halides of crotonic acid, and (2) an alcohol having the formula:

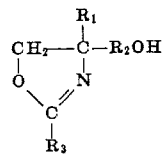

wherein $R_1$ is selected from the group consisting of hydrogen, alkyl containing from one to 10 carbon atoms and aryl groups containing from six to 10 carbon atoms, $R_2$ is selected from the group consisting of alkylene groups containing from one to 10 carbon atoms, and aralkyl groups containing up to 16 carbon atoms, and $R_3$ is selected from the group consisting of alkyl groups, aryl groups, and aralkyl groups containing up to 16 carbon atoms.

2. The compound of claim 1 wherein the monoester is 2,4-dialkyl-2-oxazoline-4-alkyl methacrylate.

3. The compound of claim 1 wherein the monoester is 2,4-dialkyl-2-oxazoline-4-alkyl acrylate.

4. The compound of claim 1 wherein the monoester is 2,4-dimethyl-2-oxazoline-4-methyl methacrylate.